US011959050B2

(12) United States Patent
Dotzauer et al.

(10) Patent No.: US 11,959,050 B2
(45) Date of Patent: Apr. 16, 2024

(54) LOW-FOAMING WAREWASH DETERGENT CONTAINING MIXED CATIONIC / NONIONIC SURFACTANT SYSTEM FOR ENHANCED OILY SOIL REMOVAL

(71) Applicant: ECOLAB USA INC., Saint Paul, MN (US)

(72) Inventors: David Dotzauer, Saint Paul, MN (US); Richard Fu, Shanghai (CN); Lisa M. Sanders, Saint Paul, MN (US); Monique Roerdink Lander, Saint Paul, MN (US); John Mansergh, Saint Paul, MN (US); Carter M. Silvernail, Saint Paul, MN (US); Matthew Luedtke, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

(21) Appl. No.: 18/150,605

(22) Filed: Jan. 5, 2023

(65) Prior Publication Data

US 2023/0159858 A1 May 25, 2023

Related U.S. Application Data

(63) Continuation of application No. 16/949,938, filed on Nov. 20, 2020, now Pat. No. 11,572,531, which is a continuation of application No. 15/774,884, filed as application No. PCT/US2016/061737 on Nov. 14, 2016, now Pat. No. 10,876,077.

(30) Foreign Application Priority Data

Nov. 12, 2015 (CN) ........................ 201510767603.9

(51) Int. Cl.

| | |
|---|---|
| ***C11D 1/835*** | (2006.01) |
| ***C11D 3/00*** | (2006.01) |
| ***C11D 3/08*** | (2006.01) |
| ***C11D 3/10*** | (2006.01) |
| ***C11D 3/12*** | (2006.01) |
| ***C11D 3/33*** | (2006.01) |
| ***C11D 3/36*** | (2006.01) |
| ***C11D 3/37*** | (2006.01) |
| *C11D 1/62* | (2006.01) |
| *C11D 1/72* | (2006.01) |

(52) U.S. Cl.

CPC ................ *C11D 3/33* (2013.01); *C11D 1/835* (2013.01); *C11D 3/0026* (2013.01); *C11D 3/08* (2013.01); *C11D 3/10* (2013.01); *C11D 3/1246* (2013.01); *C11D 3/361* (2013.01); *C11D 3/3757* (2013.01); *C11D 1/62* (2013.01); *C11D 1/72* (2013.01)

(58) Field of Classification Search

CPC ......... C11D 3/33; C11D 1/835; C11D 3/0026; C11D 3/08; C11D 3/10; C11D 3/1246; C11D 3/361; C11D 3/3757; C11D 1/62; C11D 1/72; C11D 1/722; C11D 7/14; C11D 11/0023; C11D 17/0052

See application file for complete search history.

(56) References Cited

U.S. PATENT DOCUMENTS

| | | | | |
|---|---|---|---|---|
| 3,048,548 A | 8/1962 | Martin et al. | | |
| 3,925,262 A * | 12/1975 | Laughlin | C11D 1/88 | 510/345 |
| 4,347,168 A * | 8/1982 | Murphy | C11D 1/72 | 510/504 |
| 4,931,217 A * | 6/1990 | Frankena | C11D 3/386 | 510/226 |
| 5,518,648 A | 5/1996 | Welch et al. | | |
| 5,612,305 A | 3/1997 | Lewis | | |
| 5,877,134 A | 3/1999 | Scheper et al. | | |
| 6,034,044 A | 3/2000 | Scheper et al. | | |
| 6,326,341 B1 | 12/2001 | Chatterjee et al. | | |
| 6,462,014 B1 * | 10/2002 | Johnson | C11D 3/0026 | 510/237 |
| 6,589,929 B2 | 7/2003 | De Lima et al. | | |
| 6,593,287 B1 | 7/2003 | Jordan, IV et al. | | |
| 7,012,052 B1 | 3/2006 | Kluesener et al. | | |
| 7,507,699 B2 | 3/2009 | Burt et al. | | |

(Continued)

FOREIGN PATENT DOCUMENTS

| | | |
|---|---|---|
| CA | 1109755 A1 | 9/1981 |
| CN | 1226403 C | 11/2005 |

(Continued)

OTHER PUBLICATIONS

European Patent Office, "Extended European Search Report", in connection with PCT/US2016/061737 filed Nov. 14, 2016, 11 pages, dated Jun. 3, 2019.

(Continued)

*Primary Examiner* — Charles I Boyer
(74) *Attorney, Agent, or Firm* — McKee, Voorhees & Sease, PLC

(57) ABSTRACT

The invention includes ware detergent compositions which provides superior cleaning and removal of oily and fatty soils, without the production of excessive foam. According to the invention applicants have discovered that use of a quaternary cationic surfactant in combination with a non-ionic low foaming surfactant can provide oily soil removal from ware that is superior to traditional warewash detergent formulations. Compositions for alkaline, preferably solid, warewash detergents are disclosed, as well as their use in dish machines and methods of manufacture.

18 Claims, 4 Drawing Sheets

(56) References Cited

U.S. PATENT DOCUMENTS

| | | | | |
|---|---|---|---|---|
| 8,709,169 | B2 | 4/2014 | Company et al. | |
| 2003/0056301 | A1* | 3/2003 | Dekker | C11D 11/0017 8/158 |
| 2004/0102353 | A1 | 5/2004 | Lentsch et al. | |
| 2005/0119149 | A1 | 6/2005 | Lentsch et al. | |
| 2006/0030506 | A1 | 2/2006 | Song | |
| 2006/0217286 | A1 | 9/2006 | Geoffroy et al. | |
| 2008/0004198 | A1* | 1/2008 | Joinson | C11D 17/042 510/297 |
| 2008/0188397 | A1 | 8/2008 | Company et al. | |
| 2010/0311634 | A1 | 12/2010 | Besse et al. | |
| 2011/0098418 | A1 | 4/2011 | Morschhaeuser et al. | |
| 2011/0180112 | A1* | 7/2011 | Silvernail | B08B 3/08 134/94.1 |
| 2012/0065119 | A1 | 3/2012 | Morschhaeuser et al. | |
| 2013/0345112 | A1* | 12/2013 | Sun | C11D 11/0023 510/513 |
| 2014/0174478 | A1 | 6/2014 | Letzelter et al. | |
| 2014/0193886 | A1 | 7/2014 | Adams et al. | |
| 2014/0238445 | A1* | 8/2014 | Stokes | C11D 3/48 134/28 |
| 2016/0060579 | A1* | 3/2016 | Silvernail | C11D 3/323 134/22.16 |
| 2016/0194582 | A1* | 7/2016 | Olson | C11D 1/825 510/514 |
| 2017/0275567 | A1 | 9/2017 | Caires et al. | |
| 2017/0283735 | A1 | 10/2017 | Feng et al. | |

FOREIGN PATENT DOCUMENTS

| | | | |
|---|---|---|---|
| GB | 2145726 | A | 4/1985 |
| WO | 9817769 | A1 | 4/1998 |
| WO | 0354124 | A1 | 7/2003 |

OTHER PUBLICATIONS

Israel Patent Office, "Notification of Transmittal of the International Search Report and the Written Opinion of the International Searching Authority, or the Declaration," in connection with PCT/US2016/061737, filed Nov. 14, 2016, 12 pages, dated Feb. 21, 2017.

* cited by examiner

LOW-FOAMING WAREWASH DETERGENT CONTAINING MIXED CATIONIC / NONIONIC SURFACTANT SYSTEM FOR ENHANCED OILY SOIL REMOVAL

CROSS REFERENCE TO RELATED APPLICATIONS

This is a continuation application of U.S. Ser. No. 16/949,938, filed Nov. 20, 2020, which is a continuation of U.S. Ser. No. 15/774,884, filed May 9, 2018, now U.S. Pat. No. 10,876,077, issued Dec. 29, 2020, which claims priority under 35 U.S.C. 371 as a national stage filing of PCT/US2016/061737, filed Nov. 14, 2016, which claims priority to Chinese Patent Application Serial No. 201510767603.9, filed Nov. 12, 2015, all of which are incorporated herein by reference in their entirety.

FIELD OF THE INVENTION

The invention relates to low foaming warewash detergent compositions effective for removing oily and fatty soils. Compositions employ the use of a novel surfactant system for use in alkaline detergents. Methods employing the detergent compositions for cleaning ware and methods of making the compositions are also included.

BACKGROUND OF THE INVENTION

Surfactants are the single most important cleaning ingredient in cleaning products. They surfactants reduce the surface tension of water by adsorbing at the liquid-gas interface. They also reduce the interfacial tension between oil and water by adsorbing at the liquid-liquid interface. When dissolved in water, surfactants give a product the ability to remove soil from surfaces. Each surfactant molecule has a hydrophilic head that is attracted to water molecules and a hydrophobic tail that repels water and simultaneously attaches itself to oil and grease in soil. These opposing forces loosen the soil and suspend it in the water.

Surfactants do the basic work of detergents and cleaning compositions by breaking up stains and keeping the soil in the water solution to prevent re-deposition of the soil onto the surface from which it has just been removed. Surfactants disperse soil that normally does not dissolve in water. Environmental regulations, consumer habits, and consumer practices have forced new developments in the surfactant industry to produce lower-cost, higher-performing, and environmentally friendly products.

Currently, warewash detergent compositions use low foaming non-ionic surfactants, as high foam can be a problem with commercial and consumer dish machines. These surfactants are more beneficial for spot and film prevention rather than for cleaning. Usually, low foaming non-ionic surfactants have limited solubility in the wash solution, which often reduces their cleaning abilities, especially against fatty/oily soils. Attempts at utilizing more commonly used surfactants, such as anionic surfactants, have been unsuccessful due to unacceptable foaming of such surfactants.

Oily and fatty soils have long proven difficult in warewash applications. In the past, cleaning compositions that were the most efficacious are removing these types of soils included phosphate-containing components. These cleaning compositions usually included phosphate-containing components such as trisodium phosphate and sodium tripolyphosphate (STPP), which are now banned due to environmental concerns. Since the ban, there has been a gap in performance of cleaning compositions.

In view of the foregoing, there remains an opportunity to provide improved cleaning compositions for dishwashing.

Accordingly, it is an objective of the claimed invention to develop a warewash detergent composition which provides cleaning benefits, particularly for oily and fatty soils, which is environmentally safe and which does not cause unacceptably high foaming.

BRIEF SUMMARY OF THE INVENTION

Applicants have identified a surfactant package of components typically used in hard surface cleaning applications. Applicants have identified a specific combination a cationic/nonionic surfactant blend and a defoaming surfactant, such as an alcohol alkoxylate, in a critical ratio provides a desirable low foam profile with oily soil removal that is superior to traditional warewash compositions with nonionic surfactants.

In one embodiment, the present invention provides a warewash detergent composition comprising: an alkalinity source and the surfactant component of the invention. According to the invention applicants have found that combining a quaternary alkylamine alkoxylate with a low foaming or defoaming surfactant, provides a surfactant package that improves oily and fatty soil removal when compared to traditional ware wash detergents and is also low foaming. In some aspects, the alkalinity source is selected from the group consisting of alkali metal hydroxides, alkali metal carbonates, alkali metal silicates, alkali metal metasilicates, alkali metal bicarbonates, alkali metal sesquicarbonates, and combinations thereof. In another aspect the low foaming nonionic surfactant and quaternary alkylamine alkoxylate are present in a ratio of less than 10:1, preferably from about from about 1:1 to about 5:1 respectively. In further aspects, the cationic/nonionic surfactant blend is further combined with a defoaming nonionic surfactant.

In some embodiments, the compositions and methods of use thereof provide phosphate free detergents. In other embodiments, the compositions and methods of use thereof provide phosphonate free detergents. In still other embodiments, phosphate and/or phosphonates may be desirable for inclusion in the detergent compositions.

In a further embodiment, the present invention provides a method of cleaning comprising: applying an alkaline warewash detergent composition to a substrate surface, wherein the detergent composition comprises the surfactant package of the invention and an alkalinity source comprising alkali metal hydroxides, alkali metal carbonates, alkali metal silicates, alkali metal metasilicates, alkali metal bicarbonates, alkali metal sesquicarbonates, and/or combinations of the same, wherein the detergent composition is effective for oily soil removal, and thereafter rinsing said surface to remove residual detergent and debris. In a preferred embodiment the detergent is sued in a warewash machine, as the low foaming will help prevent clogging and film buildup in the machine.

The cleaning composition includes a source of alkalinity, the surfactant package of the invention and any of a variety of other components useful for alkaline warewash cleaning compositions. For example, the composition can include components such as chelants, metal protectors, fillers, enzymes, builders, oxidizers, stabilizers, corrosion inhibitors, buffers, fragrance etc. In a preferred embodiment, the detergent is free of anionic surfactants.

Articles which require such cleaning according to the invention include any article with a surface such as plasticware, cookware, dishware, flatware, glasses, cups, hard surfaces, glass surfaces, healthcare surfaces and vehicle surfaces.

Eating and cooking utensils, dishes, and other hard surfaces such as showers, sinks, toilets, bathtubs, countertops, windows, mirrors, transportation vehicles, and floors. The invention also includes the cleaning of plastic ware. The types of plastics that can be cleaned with the compositions according to the invention include but are not limited to, those that include polycarbonate polymers (PC), acrilonitrile-butadiene-styrene polymers (ABS), and polysulfone polymers (PS). Another exemplary plastic that can be cleaned using the compounds and compositions of the invention include polyethylene terephthalate (PET).

The compositions of the present invention can be provided as a solid, powder, liquid, or gel, or a combination thereof. In one embodiment, the cleaning compositions may be provided as a concentrate such that the cleaning composition is substantially free of any added water or the concentrate may contain a nominal amount of water. The concentrate can be formulated without any water or can be provided with a relatively small amount of water in order to reduce the expense of transporting the concentrate. For example, the composition concentrate can be provided as a capsule or pellet of compressed powder, a solid, or loose powder, either contained by a water soluble material or not. In use, the concentrate is diluted for form a se composition and then applied to ware for cleaning.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DESCRIPTION OF THE FIGURES

FIG. 1A shows foam height testing without food soils and FIG. 1B shows foam height testing in the presence of food soil.

DETAILED DESCRIPTION OF THE PREFERRED EMBODIMENT

Figure 1A:
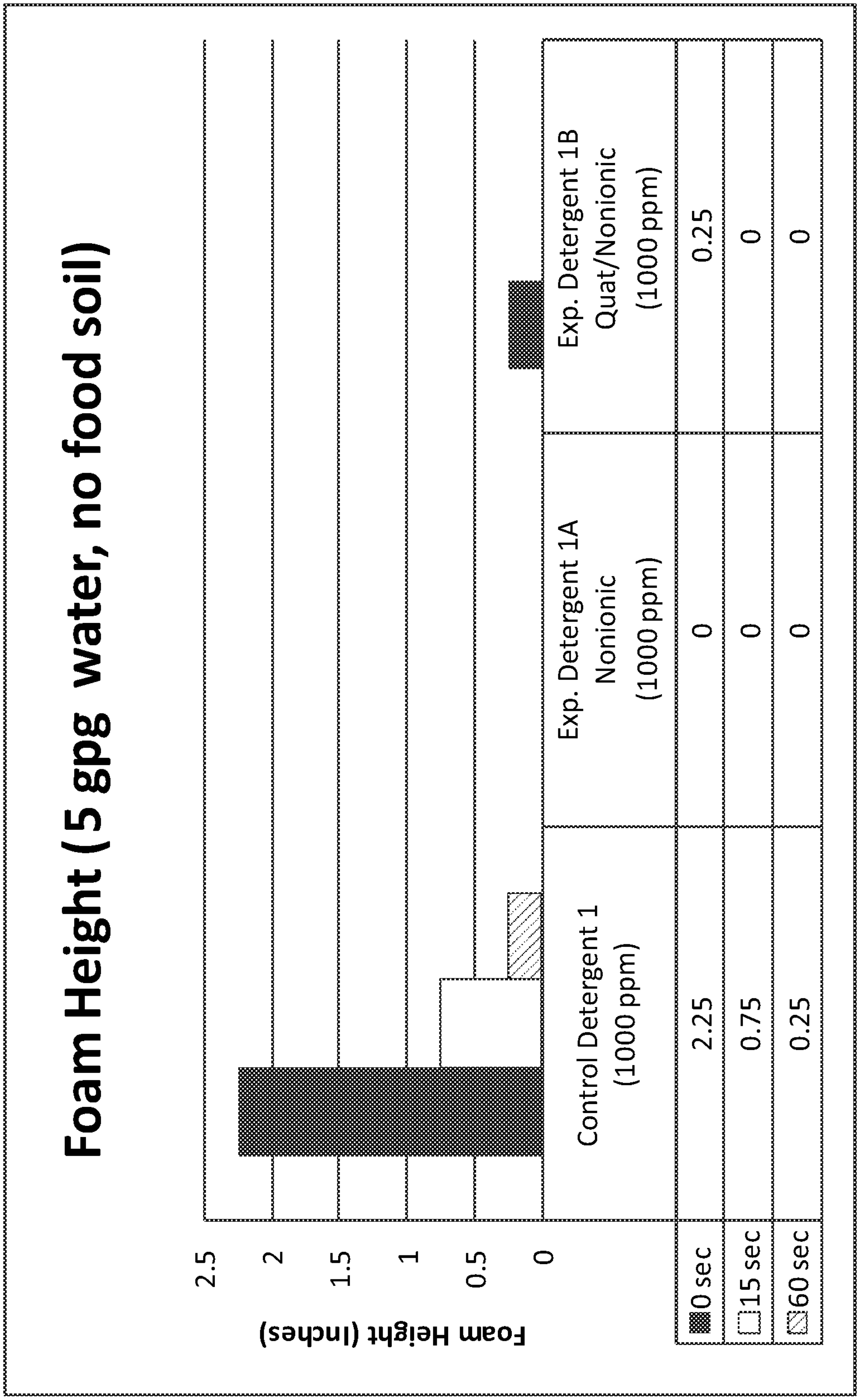
FIGS. 1A and 1B. Initial screening tests looking at different blends of surfactants and the impact they have on foam. We can see that the surfactant combination of blended cationic quaternary ammonium surfactant/nonionic surfactant/Nonionic defoaming alcohol alkoxylate surfactant showed very little foam consistent with our current ash-based chemistries that have desirable foaming properties. We have also included a negative control chemistry (Control Detergent 1) which is considered to produce an unacceptable level of foam.

The present invention relates to ware wash detergent compositions employing a novel surfactant combination that improves oily soil removal and maintains a low foaming profile. The detergent compositions have many advantages over conventional alkaline detergents. For example, the detergent compositions provide improved fatty and oily soil removal, when compared to traditional alkaline warewash detergents with nonionic surfactants. The compositions also are low foaming which is essential for automatic dish machines.

The embodiments of this invention are not limited to particular alkaline detergent compositions, which can vary and are understood by skilled artisans. It is further to be understood that all terminology used herein is for the purpose of describing particular embodiments only, and is not intended to be limiting in any manner or scope.

For example, as used in this specification and the appended claims, the singular forms “a,” “an” and “the” can include plural referents unless the content clearly indicates otherwise. Further, all units, prefixes, and symbols may be denoted in its SI accepted form. Numeric ranges recited within the specification are inclusive of the numbers defining the range and include each integer within the defined range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

As used herein, the term “about” modifying the quantity of a component or ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term “about,” the claims include equivalents to the quantities.

The term “surfactant” or “surface active agent” refers to an organic chemical that when added to a liquid changes the properties of that liquid at a surface.

“Cleaning” means to perform or aid in soil removal, bleaching, de-scaling, de-staining, microbial population reduction, rinsing, or combination thereof.

As used herein, the term “substantially free” refers to compositions completely lacking the component or having such a small amount of the component that the component does not affect the performance of the composition. The component may be present as an impurity or as a contaminant and shall be less than 0.5 wt. %. In another embodiment, the amount of the component is less than 0.1 wt. % and in yet another embodiment, the amount of component is less than 0.01 wt. %.

As used herein, a "solid" cleaning composition refers to a cleaning composition in the form of a solid such as a powder, a particle, an agglomerate, a flake, a granule, a pellet, a tablet, a lozenge, a puck, a briquette, a brick, a solid block, a unit dose, or another solid form known to those of skill in the art. The term "solid" refers to the state of the detergent composition under the expected conditions of storage and use of the solid detergent composition. In general, it is expected that the detergent composition will remain in solid form when exposed to elevated temperatures of 100° F. and preferably 120° F. A cast, pressed, or extruded "solid" may take any form including a block. When referring to a cast, pressed, or extruded solid it is meant that the hardened composition will not flow perceptibly and will substantially retain its shape under moderate stress, pressure, or mere gravity. For example, the shape of a mold when removed from the mold, the shape of an article as formed upon extrusion from an extruder, and the like. The degree of hardness of the solid cast composition can range from that of a fused solid block, which is relatively dense and hard similar to concrete, to a consistency characterized as being malleable and sponge-like, similar to caulking material.

The term "actives" or "percent actives" or "percent by weight actives" or "actives concentration" are used interchangeably herein and refers to the concentration of those ingredients involved in cleaning expressed as a percentage minus inert ingredients such as water or salts.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

As used herein, the term "substantially free" refers to compositions completely lacking the component or having such a small amount of the component that the component does not affect the effectiveness of the composition. The component may be present as an impurity or as a contaminant and shall be less than 0.5 wt. %. In another embodiment, the amount of the component is less than 0.1 wt.-% and in yet another embodiment, the amount of component is less than 0.01 wt. %.

The terms "feed water," "dilution water," and "water" as used herein, refer to any source of water that can be used with the methods and compositions of the present invention. Water sources suitable for use in the present invention include a wide variety of both quality and pH, and include but are not limited to, city water, well water, water supplied by a municipal water system, water supplied by a private water system, and/or water directly from the system or well. Water can also include water from a used water reservoir, such as a recycle reservoir used for storage of recycled water, a storage tank, or any combination thereof. Water also includes food process or transport waters. It is to be understood that regardless of the source of incoming water for systems and methods of the invention, the water sources may be further treated within a manufacturing plant. For example, lime may be added for mineral precipitation, carbon filtration may remove odoriferous contaminants, additional chlorine or chlorine dioxide may be used for disinfection or water may be purified through reverse osmosis taking on properties similar to distilled water.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polycarbonate polymers (PC), acrilonitrile-butadiene-styrene polymers (ABS), and polysulfone polymers (PS). Another exemplary plastic that can be cleaned using the compounds and compositions of the invention include polyethylene terephthalate (PET).

The term "weight percent," "wt. %," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt. %," etc.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Compositions of the Invention

Cationic Quaternary Surfactant/Quaternary Alkyl Amine Alkoxylate

The cationic quaternary surfactants are substances based on nitrogen centered cationic moieties with net positive change. Suitable cationic surfactants contain quaternary ammonium groups. Suitable cationic surfactants especially include those of the general formula:

$$N^{(+)}R^1R^2R^3R^4X^{(-)}$$

wherein $R^1$, $R^2$, $R^3$ and $R^4$ independently of each other represent alkyl groups, aliphatic groups, aromatic groups, alkoxy groups, polyoxyalkylene groups, alkylamido groups, hydroxyalkyl groups, aryl groups, $H^+$ ions, each with from 1 to 22 carbon atoms, with the provision that at least one of the groups $R^1$, $R^2$, $R^3$ and $R^4$ has at least eight carbon atoms and wherein X(−) represents an anion, for example, a halogen, acetate, phosphate, nitrate or alkyl sulfate, preferably a chloride. The aliphatic groups can also contain cross-linking or other groups, for example additional amino groups, in addition to the carbon and hydrogen atoms.

Particular cationic active ingredients include, for example, but are not limited to, alkyl dimethyl benzyl ammonium chloride (ADBAC), alkyl dimethyl ethylbenzyl ammonium chloride, dialkyl dimethyl ammonium chloride, benzethonium chloride, N, N-bis-(3-aminopropyl)

dodecylamine, chlorhexidine gluconate, an organic and/or organic salt of chlorhexidine gluconate, PHMB (polyhexamethylene biguanide), salt of a biguanide, a substituted biguanide derivative, an organic salt of a quaternary ammonium containing compound or an inorganic salt of a quaternary ammonium containing compound or mixtures thereof.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

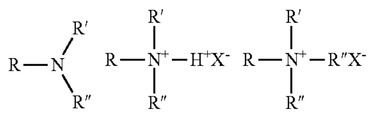

in which, R represents a long alkyl chain, R', R", and R"' may be either long alkyl chains or smaller alkyl or aryl groups or hydrogen and X represents an anion. The amine salts and quaternary ammonium compounds are preferred for practical use in this invention due to their high degree of water solubility.

In a preferred aspect, a cationic quaternary ammonium compound can be schematically shown as:

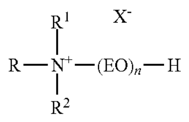

in which R represents a C8-C18 alkyl or alkenyl; $R^1$ and $R^2$ are C1-C4 alkyl groups; n is 10-25; and x is an anion selected from a halide or methyl sulfate.

The majority of large volume commercial cationic surfactants can be subdivided into four major classes and additional sub-groups known to those of skill in the art and described in "Surfactant Encyclopedia," Cosmetics & Toiletries, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present invention include those having the formula $R^1_mR^2_xYLZ$ wherein each $R^1$ is an organic group containing a straight or branched alkyl or alkenyl group optionally substituted with up to three phenyl or hydroxy groups and optionally interrupted by up to four of the following structures:

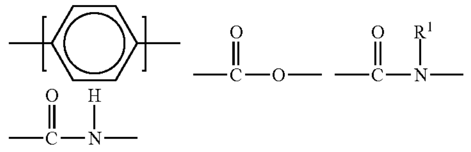

or an isomer or mixture of these structures, and which contains from 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2, or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group is filled by hydrogens.

Y can be a group including, but not limited to:

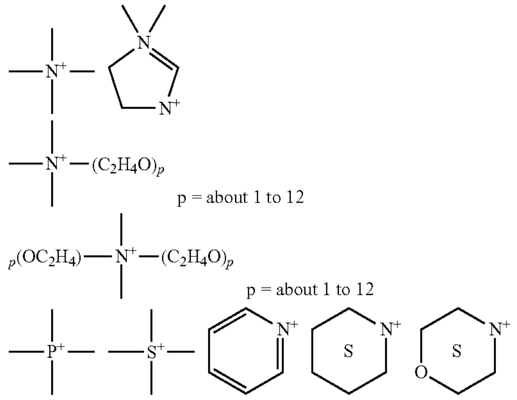

or a mixture thereof.

Preferably, L is 1 or 2, with the Y groups being separated by a moiety selected from $R^1$ and $R^2$ analogs (preferably alkylene or alkenylene) having from 1 to 22 carbon atoms and two free carbon single bonds when L is 2. Z is a water soluble anion, such as sulfate, methylsulfate, hydroxide, or nitrate anion, particularly preferred being sulfate or methyl sulfate anions, in a number to give electrical neutrality of the cationic component.

In a preferred embodiment the cationic quaternary active surfactant comes from Berol ECO (Akzo Nobel) a blended material containing cationic and nonionic surfactant (quaternary coco alkylamine ethoxylate and C9-11 Alcohol ethoxylate).

Suitable concentrations of the cationic quaternary surfactant in the cleaning composition include between about 0.01% and about 10% by weight of the cleaning composition. Particularly suitable amounts include between about 0.05% and about 7% or between about 0.1% and about 5% by weight of the cleaning composition.

Nonionic Surfactant/Low Foaming or Defoaming Nonionic Surfactants

Nonionic surfactants generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Examples include:

Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronico manufactured by BASF Corp. Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from 1,000 to 4,000. Ethylene oxide is then added to sandwich this hydrophobe between hydrophilic groups, controlled by length to constitute from about 10% by weight to about 80% by weight of the final molecule. Tetronic® compounds are tetra-functional block copolymers derived from the sequential addition of propylene oxide and ethylene oxide to ethylenediamine. The molecular weight of the propylene oxide hydrotype ranges from 500 to 7,000; and, the hydrophile, ethylene oxide, is added to constitute from 10% by weight to 80% by weight of the molecule.

Condensation products of one mole of alkyl phenol wherein the alkyl chain, of straight chain or branched chain configuration, or of single or dual alkyl constituent, contains from 8 to 18 carbon atoms with from 3 to 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Dow.

Condensation products of one mole of a saturated or unsaturated, straight or branched chain alcohol having from 6 to 24 carbon atoms with from 3 to 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol® manufactured by Shell Chemical Co. and Alfonic® manufactured by Vista Chemical Co.

Condensation products of one mole of saturated or unsaturated, straight or branched chain carboxylic acid having from 8 to 18 carbon atoms with from 6 to 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol® manufactured by Henkel Corporation and Lipopeg® manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

According to the invention, the nonionic surfactant useful in the composition is a low-foaming nonionic surfactant. Examples of nonionic low foaming surfactants useful in the present invention include:

Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from 1,000 to 3,100 with the central hydrophile including 10% by weight to 80% by weight of the final molecule. These reverse Pluronics® are manufactured by BASF Corporation under the trade name Pluronic® R surfactants.

Likewise, the Tetronic® R surfactants are produced by BASF Corporation by the sequential addition of ethylene oxide and propylene oxide to ethylenediamine. The hydrophobic portion of the molecule weighs from 2,100 to 6,700 with the central hydrophile including 10% by weight to 80% by weight of the final molecule.

Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

The alkylphenoxypolyethoxyalkanols of U.S. Pat. No. 2,903,486 issued Sep. 8, 1959 to Brown et al. and represented by the formula

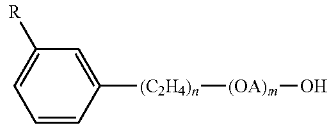

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_m$ H wherein Y is the residue of organic compound having from 1 to 6 carbon atoms and one reactive hydrogen atom, n has an average value of at least 6.4, as determined by hydroxyl number and m has a value such that the oxyethylene portion constitutes 10% to 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from 2 to 6 carbon atoms and containing x reactive hydrogen atoms in which x has a value of at least 2, n has a value such that the molecular weight of the polyoxypropylene hydrophobic base is at least 900 and m has value such that the oxyethylene content of the molecule is from 10% to 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from 8 to 18 carbon atoms and containing x reactive hydrogen atoms in which x has a value of 1 or 2, n has a value such that the molecular weight of the polyoxyethylene portion is at least 44 and m has a value such that the oxypropylene content of the molecule is from 10% to 90% by weight. In either case the oxypropylene chains may contain optionally, but advantageously, small amounts of ethylene oxide and the oxyethylene chains may contain also optionally, but advantageously, small amounts of propylene oxide.

Polyhydroxy fatty acid amide surfactants suitable for use in the present compositions include those having the structural formula $R^2CONR^1Z$ in which: $R^1$ is H, $C_1$-$C_4$ hydrocarbyl, 2-hydroxy ethyl, 2-hydroxy propyl, ethoxy, propoxy group, or a mixture thereof; R is a $C_5$-$C_{31}$ hydrocarbyl, which can be straight-chain; and Z is a polhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

The alkyl ethoxylate condensation products of aliphatic alcohols with from 0 to 25 moles of ethylene oxide are suitable for use in the present compositions. The alkyl chain of the aliphatic alcohol can either be straight or branched, primary or secondary, and generally contains from 6 to 22 carbon atoms.

The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_{10}$-$C_{18}$ ethoxylated fatty alcohols with a degree of ethoxylation of from 3 to 50.

Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from 6 to 30 carbon atoms and a polysaccharide, e.g., a polyglycoside, hydrophilic group containing from 1.3 to 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

Fatty acid amide surfactants suitable for use in the present compositions include those having the formula: $R^6CON(R^7)_2$ in which $R^6$ is an alkyl group containing from 7 to 21 carbon atoms and each $R^7$ is independently hydrogen, $C_1$-$C_4$ alkyl, $C_1$-$C_4$ hydroxyalkyl, or $-(C_2H_4O)_xH$, where x is in the range of from 1 to 3.

A useful class of non-ionic surfactants includes the class defined as alkoxylated amines or, most particularly, alcohol alkoxylated/aminated/alkoxylated surfactants. These nonionic surfactants may be at least in part represented by the general formulae:

$$R^{20}—(PO)_sN\text{-}(EO)_tH,$$

$$R_2O—(PO)_sN\text{-}(EO)_tH(EO)_tH, \text{ and}$$

$$R_{20}—N(EO)_tH;$$

in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula:

$$R^{20}—(PO)_v—N[(EO)_wH][(EO)_zH]$$

in which $R^{20}$ is as defined above, v is 1 to 20 (e.g., 1, 2, 3, or 4 (preferably 2)), and w and z are independently 1-10, preferably 2-5.

These compounds are represented commercially by a line of products sold by Huntsman Chemicals as nonionic surfactants. A preferred chemical of this class includes, but is not limited to Surfonic PEA 25 Amine Alkoxylate.

A preferred class of low foaming nonionic surfactants includes those represented by the formula:

$$RO—(PO)_x(EO)_y(PO)_xH$$

wherein R is C8-18 alkyl, PO represents propylene oxide; EO represents ethylene oxide; x is 0-8 and y is 1-20.

A preferred class of defoaming surfactants include those represented by the formula:

$$RO—(PO)_x(EO)_y(PO)_z$$

wherein R is C8-C18 alkyl, PO represents propylene oxide; EO represents ethylene oxide; x is 0-5; y is 10-20 and z is 10-20.

These compounds are represented commercially by a line of products sold by BASF Corporation as nonionic surfactants. A preferred chemical of this class includes, but is not limited to Plurafac SLF 180.

The treatise Nonionic Surfactants, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Suitable amounts of the low foaming or nonfoaming nonionic surfactant include between about 0.01% and about 15% by weight of the cleaning solution. Particularly suitable amounts include between about 0.1% and about 12% or between about 0.5% and about 10% by weight of the cleaning solution.

According to the invention, applicants have discovered that the critical ratio of nonionic surfactant to cationic quaternary surfactant should be greater than 1:1, preferably 3:1 and not more than 5:1 of nonionic surfactant to quaternary cationic surfactant.

In an aspect, the blend of the ratio of nonionic surfactant to cationic quaternary surfactant is greater than 1:1, preferably 3:1 and not more than 5:1 of nonionic surfactant to quaternary cationic surfactant, and such blended nonionic/cationic surfactant is further combined with a non-foaming or defoaming nonionic surfactant. In an aspect, the defoaming nonionic surfactant, preferably an alcohol alkoxylate is present in the composition in an amount from about 0.1 wt. % to about 10 wt. %, preferably from about 0.5 wt. % to about 10 wt. %, preferably from about, or from about 1 wt. % to about 5 wt. %.

Alkalinity Source

The detergent compositions include an alkalinity source. Exemplary alkalinity sources include alkali metal carbonates and/or alkali metal hydroxides.

Alkali metal carbonates used in the formulation of detergents are often referred to as ash-based detergents and most often employ sodium carbonate. Additional alkali metal carbonates include, for example, sodium or potassium carbonate. In aspects of the invention, the alkali metal carbonates are further understood to include metasilicates, silicates, bicarbonates and sesquicarbonates. According to the invention, any "ash-based" or "alkali metal carbonate" shall also be understood to include all alkali metal carbonates, metasilicates, silicates, bicarbonates and/or sesquicarbonates.

Alkali metal hydroxides used in the formulation of detergents are often referred to as caustic detergents. Examples of suitable alkali metal hydroxides include sodium hydroxide, potassium hydroxide, and lithium hydroxide. Exemplary alkali metal salts include sodium carbonate, potassium carbonate, and mixtures thereof. The alkali metal hydroxides may be added to the composition in any form known in the art, including as solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 45% and a 50% by weight solution.

In addition to the first alkalinity source, the detergent composition may comprise a secondary alkalinity source. Examples of useful secondary alkaline sources include, but are not limited to: metal silicates such as sodium or potassium silicate or metasilicate; metal carbonates such as sodium or potassium carbonate, bicarbonate, sesquicarbonate; metal borates such as sodium or potassium borate; and ethanolamines and amines. Such alkalinity agents are commonly available in either aqueous or powdered form, either of which is useful in formulating the present detergent compositions.

An effective amount of one or more alkalinity sources is provided in the detergent composition. An effective amount is referred to herein as an amount that provides a use composition having a pH of at least about 9, preferably at least about 10. When the use composition has a pH of between about 9 and about 10, it can be considered mildly alkaline, and when the pH is greater than about 12, the use composition can be considered caustic. In some circumstances, the detergent composition may provide a use composition that is useful at pH levels below about 9, such as through increased dilution of the detergent composition. In general, the amount of alkalinity provided in the concentrate can be in an amount of at least about 0.05 wt. % based on the weight of the alkaline concentrate. The source of alkalinity in the concentrate is preferably between about 0.05 wt. % and about 99 wt. %, more preferably is between about 0.1 wt. % and about 95 wt. %, more preferably is between about 0.5 wt. % and about 90 wt. %, more preferably between at least about 40 wt. % and 90 wt. %, more preferably between at least about 50 wt. % and 90 wt. %, and most preferably between at least about 70 wt. % and 90 wt. %.

Additional Surfactant

The detergent composition can include one or more additional surfactants. Any of a variety of additional surfactants can be used in the warewashing composition, such as anionic, nonionic, cationic, and zwitterionic surfactants, although the compositions is preferably free of anionic surfactants. It should be understood that additional surfactants are an optional component of the detergent composition and can be excluded. Exemplary ranges of additional surfactant in a concentrate include about 0.05 wt. % to 15 wt. %, more preferably about 0.5 wt. % to 10 wt. %, and most preferably about 1 wt. % to 7.5 wt. %.

Exemplary surfactants that can be used are commercially available from a number of sources. For a discussion of surfactants, see Kirk-Othmer, Encyclopedia of Chemical Technology, Third Edition, volume 8, pages 900-912. When the composition includes a cleaning agent, the cleaning agent can be provided in an amount effective to provide a desired level of cleaning.

Anionic surfactants useful detergent compositions include, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. Exemplary anionic surfactants include sodium alkylarylsulfonate, alpha-olefinsulfonate, and fatty alcohol sulfates.

Nonionic surfactants useful in the detergent composition include, for example, those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer such as those commercially available under the trademark PLURONIC® (BASF-Wyandotte), and the like; and other like nonionic compounds. Silicone surfactants such as the ABIL® B8852 can also be used.

Cationic surfactants that can be used in the detergent composition include amines such as primary, secondary and tertiary monoamines with $C_{1-8}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$) dimethylbenzyl ammonium chloride, n-tetradecyldimethylbenzylammonium chloride monohydrate, a naphthylene-substituted quaternary ammonium chloride such as dimethyl-1-naphthylmethylammonium chloride, and the like. The cationic surfactant can be used to provide sanitizing properties.

Zwitterionic surfactants that can be used in the detergent composition include betaines, imidazolines, and propinates.

Chelants

The compositions of the invention can also include a chelant at a level of from 0.1% to 35%, preferably from 0.2% to 30%, more preferably from 0.3% to 25% by weight of total composition. Chelation herein means the binding or complexation of a bi- or multidentate ligand. These ligands, which are often organic compounds, are called chelants, chelators, chelating agents, and/or sequestering agent. Chelating agents form multiple bonds with a single metal ion. Chelants, are chemicals that form soluble, complex molecules with certain metal ions, inactivating the ions so that they cannot normally react with other elements or ions to produce precipitates or scale. The ligand forms a chelate complex with the substrate. The term is reserved for complexes in which the metal ion is bound to two or more atoms of the chelant. The chelants for use in the present invention are those having crystal growth inhibition properties, i.e. those that interact with the small calcium and magnesium carbonate particles preventing them from aggregating into hard scale deposit. The particles repel each other and remain suspended in the water or form loose aggregates which may settle. These loose aggregates are easily rinse away and do not form a deposit.

In general, a chelating agent is a molecule capable of coordinating (i.e., binding) the metal ions commonly found in natural water to prevent the metal ions from interfering with the action of the other detersive ingredients of a cleaning composition. Preferable levels of addition for builders that can also be chelating or sequestering agents are between about 0.1% by weight to about 70% by weight, about 1% by weight to about 60% by weight, or about 1.5% by weight to about 50% by weight. If the solid composition is provided as a concentrate, the concentrate can include between approximately 1% by weight to approximately 60% by weight, between approximately 3% by weight to approximately 50% by weight, and between approximately 6% by weight to approximately 45% by weight of the builders. Additional ranges of the builders include between approximately 3% by weight to approximately 20% by weight, between approximately 6% by weight to approximately 15% by weight, between approximately 25% by weight to approximately 50% by weight, and between approximately 35% by weight to approximately 45% by weight.

Suitable chelating agents can be selected from the group consisting of amino carboxylates (this may be the same amino carboxylate that is used for metal protection, or an additional further amino carboxylate), aminocarboxylic acids, phosphonates including amino phosphonates, condensed phosphates, alkali metal carbonates, polyacrylates, polyfunctionally-substituted aromatic chelating agents and mixtures thereof. Preferred chelants for use herein are the aminocarboxylic acid chelants such as glutamic acid-N,N-diacetic acid (GLDA) and methylglycine-N,N-diacetic acid (MGDA) as well as and hydroxycarboxylic acids such as, but not limited to citric acid, gluconic acid, glucoheptonic acid and succinic acid and salts and combinations thereof.

Other suitable chelating agents include, but are not limited to ethylenediaminetetra-acetic acid (EDTA), N-hydroxyethylethylenediaminetriacetic acid (HEDTA), nitrilotriacetic acid (NTA), ethylenediamine tetrapro-prionates, triethylenetetraaminehexacetates, diethylenetriaminepentaacetic acid (DTPA), and ethanoldi-glycines, alkali metal, ammonium, and substituted ammonium salts therein and mixtures therein.

Other suitable chelants include amino acid based compound or a succinate based compound. The term "succinate based compound" and "succinic acid based compound" are used interchangeably herein. Other suitable chelants are described in U.S. Pat. No. 6,426,229. Particular suitable chelants include; for example, aspartic acid-N-monoacetic acid (ASMA), aspartic acid-N,N-diacetic acid (ASDA), aspartic acid-N-monopropionic acid (ASMP), iminodisuccinic acid (IDS), Imino diacetic acid (IDA), N-(2-sulfomethyl)aspartic acid (SMAS), N-(2-sulfoethyl)aspartic acid (SEAS), N-(2-sulfomethyl)glutamic acid (SMGL), N-(2-sulfoethyl)glutamic acid (SEGL), N-methyliminodiacetic acid (MIDA), alanine-N,N-diacetic acid(ALDA), serine-N,N-diacetic acid (SEDA), isoserine-N,N-diacetic acid (ISDA), phenylalanine-N,N-diacetic acid (PHDA), anthranilic acid-N,N-diacetic acid (ANDA), sulfanilic acid-N,N-diacetic acid (SLDA), taurine-N,N-diacetic acid (TUDA) and sulfomethyl-N,N-diacetic acid (SMDA) and alkali metal salts or ammonium salts thereof. Also suitable is ethylenediamine disuccinate ("EDDS"), especially the [S,S] isomer as described in U.S. Pat. No. 4,704,233. Furthermore, Hydroxyethyleneiminodiacetic acid, Hydroxyiminodisuccinic acid, Hydroxyethylene diaminetriacetic acid is also suitable. Particularly preferred is alanine, N,N-bis(carboxymethyl)-, trisodium salt.

Other chelants include homopolymers and copolymers of polycarboxylic acids and their partially or completely neutralized salts, monomeric polycarboxylic acids and hydroxycarboxylic acids and their salts. Preferred salts of the abovementioned compounds are the ammonium and/or alkali metal salts, i.e. the lithium, sodium, and potassium salts, and particularly preferred salts are the sodium salts.

Suitable polycarboxylic acids are acyclic, alicyclic, heterocyclic and aromatic carboxylic acids, in which case they contain at least two carboxyl groups which are in each case separated from one another by, preferably, no more than two carbon atoms. Polycarboxylates which comprise two carboxyl groups include, for example, water-soluble salts of, malonic acid, (ethyl enedioxy) diacetic acid, maleic acid, diglycolic acid, tartaric acid, tartronic acid and fumaric acid. Polycarboxylates which contain three carboxyl groups include, for example, water-soluble citrate. Correspondingly, a suitable hydroxycarboxylic acid is, for example, citric acid. Another suitable polycarboxylic acid is the homopolymer of acrylic acid. Preferred are the polycarboxylates end capped with sulfonates.

Examples of condensed phosphates include, but are not limited to: sodium and potassium orthophosphate, sodium and potassium pyrophosphate, sodium tripolyphosphate, and sodium hexametaphosphate. A condensed phosphate may also assist, to a limited extent, in solidification of the composition by fixing the free water present in the composition as water of hydration.

Amino phosphonates are also suitable for use as chelating agents and include ethylenediaminetetrakis(methylenephosphonates) as DEQUEST. Preferred, these amino phosphonates that do not contain alkyl or alkenyl groups with more than about 6 carbon atoms.

Polyfunctionally-substituted aromatic chelating agents are also useful in the compositions herein such as described in U.S. Pat. No. 3,812,044. Preferred compounds of this type in acid form are dihydroxydisulfobenzenes such as 1,2-dihydroxy-3,5-disulfobenzene.

Further suitable polycarboxylates chelants for use herein include citric acid, lactic acid, acetic acid, succinic acid, formic acid all preferably in the form of a water-soluble salt. Other suitable polycarboxylates are oxodisuccinates, carboxymethyloxysuccinate and mixtures of tartrate monosuccinic and tartrate disuccinic acid such as described in U.S. Pat. No. 4,663,071.

Corrosion Inhibitor/Metal Protector

The detergent composition may also include a corrosion inhibitor. In general, it is expected that the corrosion inhibitor component will loosely hold calcium to reduce precipitation of any calcium carbonate (when this is used as an alkalinity source) once it is subjected to a pH of at least 8.0.

Exemplary corrosion inhibitors include phosphonocarboxylic acids, phosphonates, phosphates, polymers, and mixtures thereof. Exemplary phosphonocarboxylic acids include those available under the name Bayhibit™ AM from Bayer, and include 2-phosphonobutane-1,2,4, tricarboxylic acid (PBTC). Exemplary phosphonates include amino tri (methylene phosphonic acid), 1-hydroxy ethylidene 1-1-diphosphonic acid, ethylene diamine tetra (methylene phosphonic acid), hexamethylene diamine tetra (methylene phosphonic acid), diethylene triamine penta (methylene phosphonic acid), and mixtures thereof. Exemplary phosphonates are available under the name Dequest™ from Monsanto. Exemplary polymers include polyacrylates, polymethacrylates, polyacrylic acid, polyitaconic acid, polymaleic acid, sulfonated polymers, copolymers and mixtures thereof. It should be understood that the mixtures can include mixtures of different acid substituted polymers within the same general class. In addition, it should be understood that salts of acid substituted polymers can be used. The useful carboxylated polymers may be generically categorized as water-soluble carboxylic acid polymers such as polyacrylic and polymethacrylic acids or vinyl addition polymers. Of the vinyl addition polymers contemplated, maleic anhydride copolymers as with vinyl acetate, styrene, ethylene, isobutylene, acrylic acid and vinyl ethers are examples. The polymers tend to be water-soluble or at least colloidally dispersible in water. The molecular weight of these polymers may vary over a broad range although it is preferred to use polymers having average molecular weights ranging between 1,000 up to 1,000,000, more preferably a molecular weight of 100,000 or less, and most preferably a molecular weight between 1,000 and 10,000.

The polymers or copolymers (either the acid-substituted polymers or other added polymers) may be prepared by either addition or hydrolytic techniques. Thus, maleic anhydride copolymers are prepared by the addition polymerization of maleic anhydride and another comonomer such as styrene. The low molecular weight acrylic acid polymers may be prepared by addition polymerization of acrylic acid or its salts either with itself or other vinyl comonomers. Alternatively, such polymers may be prepared by the alkaline hydrolysis of low molecular weight acrylonitrile homopolymers or copolymers. For such a preparative technique see Newman U.S. Pat. No. 3,419,502.

The corrosion inhibitor/metal protector can be provided in a range of about 0.01 wt. % to about 20 wt. %, and more preferably in a range between about 0.05 wt. % and about 15 wt. %, and most preferably between about 0.1% and 10% based on the weight of the concentrate. It should be understood that the polymers, phosphonocarboxylates, and phosphonates can be used alone or in combination.

In addition to providing alkalinity and having anti-redeposition properties silicates can also provide further metal protection. Exemplary silicates include sodium silicate and potassium silicate. The detergent composition can be provided without silicates, but when silicates are included, they can be included in amounts that provide for desired metal protection. The concentrate can include silicates in a range between about 1 wt. % and about 80 wt. %, more preferably between about 5 wt. % and about 70 wt. %, and most preferably between about 10 wt. % and 60 wt. %.

Water Conditioning Agents

The detergent composition may also include a water conditioning agent. Water conditioning agents can include one or more phosphonates. Examples of phosphonates include, but are not limited to: phosphinosuccinic acid oligomer (PSO) described in U.S. Pat. No. 8,871,699, 2-phosphonobutane-1,2,4-tricarboxylic acid (PBTC), 1-hydroxyethane-1,1-diphosphonic acid, HEDPaminotri(methylenephosphonic acid); 2-hydroxyethyliminobis(methylenephosphonic acid), diethylenetriaminepenta (methylenephosphonic acid), diethylenetriaminepenta (methylenephosphonate), sodium salt (DTPMP), hexamethylenediamine(tetramethylenephosphonate), potassium salt bis(hexamethylene)triamine(pentamethylenephosphonic acid); and phosphorus acid. Preferred phosphonates are PSO, PBTC, HEDP, ATMP and DTPMP.

The composition may also include one or more water conditioning polymers. Suitable water conditioning polymers may include one or more polycarboxylates. A variety of such polycarboxylate homopolymers, copolymers and terpolymers are known and described in patent and other literature, and are available commercially. Exemplary polycarboxylates that may be utilized according to the invention include for example: homopolymers, copolymers and terpolymers of polyacrylates; polymethacrylates; polymaleates. Examples of suitable polymers include acrylic acid homopolymers, maleic acid homopolymers, methacrylic acid homopolymers, acrylic/maleic copolymers, maleic acid copolymers, acrylic/methacrylic copolymers, maleic acid terpolymers, hydrophobically modified acrylic acid copolymers and terpolymers, hydrophobically modified maleic acid copolymers and terpolymers, hydrophobically modified methacrylic acid copolymers and terpolymers. Suitable water conditioning polymers preferably have a molecular weight between about 500 to about 50,000 g/mol, more preferably between about 500 and about 25,000 g/mol and particularly between about 500 and about 10,000 g/mol. Preferred polymers include, but are not limited to Acusol 445N, Acusol 425N, Acusol 441, Acusol 448 (available from Dow Chemical); Sokalan CP10, Sokalan CP12, Sokalan CP9, Sokalan CP50, Sokalan PA13PN, Sokalan PA15, Sokalan PA20, Sokalan PA25 (Available from BASF); Carbosperse K-7058, Carbosperse K-7028, and Carbosperse K-775 (Available from Lubrizol); Belclene 200, Belclene 283, Belcene 810 (available from BWA Water Additives). The composition of the invention may also include combinations of sequestering agents/phosphonates and/or water conditioning polymers.

The water conditioning agent can be provided in a range of about 0.01 wt. % to about 20 wt. %, and more preferably in a range between about 0.05 wt. % and about 15 wt. %, and most preferably between about 0.1% and about 10% based on the weight of the concentrate. It should be understood that the water conditioning agent and polymers can be used alone or in combination.

Fillers

The rinse aid can optionally include a minor but effective amount of one or more of a filler which does not necessarily perform as a rinse and/or cleaning agent per se, but may cooperate with a rinse agent to enhance the overall capacity of the composition. Some examples of suitable fillers may include sodium chloride, starch, sugars, $C_1$-$C_{10}$ alkylene glycols such as propylene glycol, and the like. In some embodiments, a filler can be included in an amount in the range of up to about 20 wt. %, and in some embodiments, in the range of about 1 wt. % to about 15 wt. %. Sodium sulfate is conventionally used as inert filler.

pH-Adjusting Compound

The composition of the present invention can include the pH-adjusting compounds to achieve the desired alkalinity of the detergent. The pH-adjusting compound, if present is present in an amount sufficient to achieve the desired pH, typically of about 0.5% to about 3.5%, by weight.

Examples of basic pH-adjusting compounds include, but are not limited to, ammonia; mono-, di-, and trialkyl amines; mono-, di-, and trialkanolamines; alkali metal and alkaline earth metal hydroxides; alkali metal phosphates; alkali sulfates; alkali metal carbonates; and mixtures thereof. However, the identity of the basic pH adjuster is not limited, and any basic pH-adjusting compound known in the art can be used. Specific, nonlimiting examples of basic pH-adjusting compounds are ammonia; sodium, potassium, and lithium hydroxides; sodium and potassium phosphates, including hydrogen and dihydrogen phosphates; sodium and potassium carbonate and bicarbonate; sodium and potassium sulfate and bisulfate; monoethanolamine; trimethylamine; isopropanolamine; diethanolamine; and triethanolamine.

Water

The detergent composition includes water. Water many be independently added to the composition or may be provided in the composition as a result of its presence in an aqueous material that is added to the composition. For example, materials added to the composition include water or may be prepared in an aqueous premix available for reaction with the solidification agent component(s). Typically, water is introduced into the composition to provide the detergent composition with a desired viscosity prior to solidification, and to provide a desired rate of solidification.

In general, it is expected that water may be present as a processing aid and may be removed or become water of hydration. It is expected that water may be present in the composition. In the solid composition, it is expected that the water will be present in the range of between about 2 wt. % and about 15 wt. %. For example, water is present in embodiments of the composition in the range of between about 2 wt. % to about 12 wt. %, or further embodiments in the range of between about 3 wt. % and about 10 wt. %, or yet further embodiments in the range of between about 3 wt. % and about 4 wt. %. It should be additionally appreciated that the water may be provided as deionized water or as softened water.

Hardening/Solidification Agents/Solubility Modifiers

Traditionally, sodium sulfate and urea are used for solidification if the composition is to be in solid form. Examples of other hardening agents include an amide such stearic monoethanolamide or lauric diethanolamide, or an alkylamide, and the like; a solid polyethylene glycol, or a solid EO/PO block copolymer, and the like; starches that have been made water-soluble through an acid or alkaline treatment process; various inorganics that impart solidifying properties to a heated composition upon cooling, and the like. Such compounds may also vary the solubility of the composition in an aqueous medium during use such that the rinse aid and/or other active ingredients may be dispensed from the solid composition over an extended period of time. The composition may include a hardening agent in an amount in the range of up to about 30 wt. %. In some embodiments, hardening agents are may be present in an amount in the range of about 5 wt. % to about 25 wt. %, often in the range of 10 wt. % to about 25 wt. % and sometimes in the range of about 5 wt. % to about 15 wt.-%.

Other Additives

The detergent composition can include other additives such as bleaching agents, detergent builders, hardening agents or solubility modifiers, defoamers, anti-redeposition agents, threshold agents, stabilizers, dispersants, enzymes, aesthetic enhancing agents (i.e., dye, perfume), and the like. Adjuvants and other additive ingredients will vary according to the type of composition being manufactured. It should be understood that these additives are optional and need not be included in the cleaning composition. When they are included, they can be included in an amount that provides for the effectiveness of the particular type of component.

Bleaching Agents

Bleaching agents for use in a cleaning compositions for lightening or whitening a substrate, include bleaching compounds capable of liberating an active halogen species, such as $Cl_2$, $Br_2$, —OCL and/or —$OBr^-$, under conditions typically encountered during the cleansing process. Suitable bleaching agents for use in the present cleaning compositions include, for example, chlorine-containing compounds such as chlorine, hypochlorite, and/or chloramine. Exemplary halogen-releasing compounds include the alkali metal dichloroisocyanurates, chlorinated trisodium phosphate, the alkali metal hypochlorites, monochloramine and dichloroamine, and the like. Encapsulated chlorine sources may also be used to enhance the stability of the chlorine source in the composition (see, for example, U.S. Pat. Nos. 4,618,914 and 4,830,773, the disclosure of which is incorporated by reference herein). A bleaching agent may also be a peroxygen or active oxygen source such as hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like. The composition can include an effective amount of a bleaching agent. In a preferred embodiment when the concentrate includes a bleaching agent, it can be included in an amount of about 0.1 wt. % to about 60 wt. %, more preferably between about 1 wt. % and about 20 wt. %, and most preferably between about 3 wt. % and about 8 wt. %.

Defoaming Agent

A defoaming agent for reducing the stability of foam may also be included in the composition to reduce foaming. When the concentrate includes a defoaming agent, the defoaming agent can be provided in an amount of between about 0.01 wt. % and about 3 wt. %.

Examples of defoaming agents that can be used in the composition includes ethylene oxide/propylene block copolymers silicone compounds such as silica dispersed in polydimethylsiloxane, polydimethylsiloxane, and functionalized polydimethylsiloxane such as those available under the name Abil B9952, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein.

Anti-Redeposition Agent

The composition can include an anti-redeposition agent for facilitating sustained suspension of soils in a cleaning solution and preventing the removed soils from being redeposited onto the substrate being cleaned. Examples of suitable anti-redeposition agents include fatty acid amides, fluorocarbon surfactants, complex phosphate esters, styrene maleic anhydride copolymers, and cellulosic derivatives such as hydroxyethyl cellulose, hydroxypropyl cellulose, and the like. In a preferred embodiment, the anti-redeposition agent, when included in the concentrate, is added in an amount between about 0.5 wt. % and about 10 wt. %, and more preferably between about 1 wt. % and about 5 wt. %.

Stabilizing agents that can be used include primary aliphatic amines, betaines, borate, calcium ions, sodium citrate, citric acid, sodium formate, glycerine, maleonic acid, organic diacids, polyols, propylene glycol, and mixtures thereof. The concentrate need not include a stabilizing agent, but when the concentrate includes a stabilizing agent, it can be included in an amount that provides the desired level of stability of the concentrate. In a preferred embodiment the amount of stabilizing agent is about 0 wt. % to about 20 wt. %, more preferably about 0.5 wt. % to about 15 wt. %, and most preferably about 2 wt. % to about 10 wt. %.

Dispersants

Dispersants that can be used in the composition include maleic acid/olefin copolymers, polyacrylic acid, and mixtures thereof. The concentrate need not include a dispersant, but when a dispersant is included it can be included in an amount that provides the desired dispersant properties. Exemplary ranges of the dispersant in the concentrate can be between about 0 wt. % and about 20 wt. %, more preferably between about 0.5 wt. % and about 15 wt. %, and most preferably between about 2 wt. % and about 9 wt. %.

Enzymes

Enzymes can be included in the composition to aid in soil removal of robust soils such as starch, protein, and the like. Exemplary types of enzymes include proteases, alpha-amylases, and mixtures thereof. Exemplary proteases that can be used include those derived from *Bacillus licheniformix, Bacillus lenus, Bacillus alcalophilus*, and *Bacillus amyloliquefacins*. Exemplary alpha-amylases include *Bacillus subtilis, Bacillus amyloliquefaceins* and *Bacillus licheniformis*. The concentrate need not include an enzyme. When the concentrate includes an enzyme, it can be included in an amount that provides the desired enzymatic activity when the warewashing composition is provided as a use composition. Exemplary ranges of the enzyme in the concentrate include between about 0 and about 15 wt. %, more preferably between about 0.5 wt. % and about 10 wt. %, and most preferably between about 1 wt. % and about 5 wt. %.

Dyes, Odorants, and the Like

Various dyes, odorants including perfumes, and other aesthetic enhancing agents can be included in the composition. Dyes may be included to alter the appearance of the composition, as for example, Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keystone Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the compositions include, for example, terpenoids such as citronellol, aldehydes such as amyl cinnamaldehyde, a jasmine such as C1S-jasmine or jasmal, vanillin, and the like.

Formulations

The detergent compositions according to the invention may be formulated into solids, liquids, powders, pastes, gels, etc.

Solid detergent compositions provide certain commercial advantages for use according to the invention. For example, use of concentrated solid detergent compositions decrease shipment costs as a result of the compact solid form, in comparison to bulkier liquid products. In certain embodiments of the invention, solid products may be provided in the form of a multiple-use solid, such as, a block or a plurality of pellets, and can be repeatedly used to generate aqueous use solutions of the detergent composition for multiple cycles or a predetermined number of dispensing cycles. In certain embodiments, the solid detergent compositions may have a mass greater than about 5 grams, such as for example from about 5 grams to 10 kilograms. In certain embodiments, a single-use form or a unit dose or small tablet size form of the solid detergent composition has a mass of about 20 grams to about 100 grams. In certain embodiments, a multiple-use form of the solid detergent composition has a mass of about 1 kilogram to about 10 kilogram or greater.

When the detergent components are processed are processed to form a solid, it is expected that the components can be processed by extrusion, casting, or pressing solid techniques. In general, when the components are processed by extrusion techniques, it is believed that the composition can include a relatively smaller amount of water as an aid for processing compared with the casting techniques. In general, when preparing the solid by extrusion, it is expected that the composition can contain between about 2 wt. % and about 15 wt. % water. When preparing the solid by casting, it is expected that the amount of water can be provided in an amount between about 10 wt. % and about 50 wt. %. When preparing a solid by a pressing process, it is expected that the amount of water can be provided in the amount between about 0 wt % and about 15 wt %.

The detergents of the invention may exist in a use solution or concentrated solution that is in any form including liquid, free flowing granular form, powder, gel, paste, solids, slurry, and foam.

In some embodiments, in the formation of a solid composition, a mixing system may be used to provide for continuous mixing of the ingredients at high enough shear to form a substantially homogeneous solid or semi-solid mixture in which the ingredients are distributed throughout its mass. In some embodiments, the mixing system includes means for mixing the ingredients to provide shear effective for maintaining the mixture at a flowable consistency, with a viscosity during processing in the range of about 1,000-1,000,000 cP, or in the range of about 50,000-200,000 cP. In some example embodiments, the mixing system can be a continuous flow mixer or in some embodiments, an extruder, such as a single or twin screw extruder apparatus. A suitable amount of heat may be applied from an external source to facilitate processing of the mixture.

The mixture is typically processed at a temperature to maintain the physical and chemical stability of the ingredients. In some embodiments, the mixture is processed at temperatures in the range of about 100 to 140° F. In certain other embodiments, the mixture is processed at temperatures in the range of 110-125° F. Although limited external heat may be applied to the mixture, the temperature achieved by the mixture may become elevated during processing due to friction, variances in ambient conditions, and/or by an exothermic reaction between ingredients. Optionally, the temperature of the mixture may be increased, for example, at the inlets or outlets of the mixing system.

An ingredient may be in the form of a liquid or a solid such as a dry particulate, and may be added to the mixture separately or as part of a premix with another ingredient, as for example, the preservative, dispersant, sequestrant, hydrotrope, chelants, an aqueous medium, hardening agent and the like. One or more premixes may be added to the mixture.

The ingredients are mixed to form a substantially homogeneous consistency wherein the ingredients are distributed substantially evenly throughout the mass. The mixture can be discharged from the mixing system through a die or other shaping means. The profiled extrudate then can be divided into useful sizes with a controlled mass. Optionally, heating and cooling devices may be mounted adjacent to mixing apparatus to apply or remove heat in order to obtain a desired temperature profile in the mixer. For example, an external source of heat may be applied to one or more barrel sections of the mixer, such as the ingredient inlet section, the final outlet section, and the like, to increase fluidity of the mixture during processing. In some embodiments, the temperature of the mixture during processing, including at the discharge port, is maintained in the range of about 100 to 140° F.

The composition hardens due to the chemical or physical reaction of the requisite ingredients forming the solid. The solidification process may last from a few minutes to about six hours, or more, depending, for example, on the size of the cast or extruded composition, the ingredients of the composition, the temperature of the composition, and other like factors. In some embodiments, the cast or extruded composition "sets up" or begins to hardens to a solid form within about 1 minute to about 3 hours, or in the range of about 1 minute to about 2 hours, or in some embodiments, within about 1 minute to about 20 minutes.

In some embodiments, the extruded solid can be packaged, for example in a container or in film. The temperature of the mixture when discharged from the mixing system can be sufficiently low to enable the mixture to be cast or extruded directly into a packaging system without first cooling the mixture. The time between extrusion discharge and packaging may be adjusted to allow the hardening of the composition for better handling during further processing and packaging. In some embodiments, the mixture at the point of discharge is in the range of about 100 to 140° F. In certain other embodiments, the mixture is processed at temperatures in the range of 110-125° F. The composition is then allowed to harden to a solid form that may range from a low density, sponge-like, malleable, caulky consistency to a high density, fused solid, concrete-like solid.

Methods of Use

Methods of use employing the detergent compositions according to the invention are particularly suitable for institutional ware washing. Exemplary disclosure of warewashing applications is set forth in U.S. patent application Ser. Nos. 13/474,771, 13/474,780 and 13/112,412, including all references cited therein, which are herein incorporated by reference in its entirety. The method may be carried out in any consumer or institutional dish machine, including for example those described in U.S. Pat. No. 8,092,613, which is incorporated herein by reference in its entirety, including all figures and drawings. Some non-limiting examples of dish machines include door machines or hood machines, conveyor machines, undercounter machines, glasswashers, flight machines, pot and pan machines, utensil washers, and consumer dish machines. The dish machines may be either single tank or multi-tank machines.

A door dish machine, also called a hood dish machine, refers to a commercial dish machine wherein the soiled dishes are placed on a rack and the rack is then moved into the dish machine. Door dish machines clean one or two racks at a time. In such machines, the rack is stationary and the wash and rinse arms move. A door machine includes two sets arms, a set of wash arms and a rinse arm, or a set of rinse arms.

Door machines may be a high temperature or low temperature machine. In a high temperature machine the dishes are sanitized by hot water. In a low temperature machine the dishes are sanitized by the chemical sanitizer. The door machine may either be a recirculation machine or a dump and fill machine. In a recirculation machine, the detergent solution is reused, or "recirculated" between wash cycles. The concentration of the detergent solution is adjusted between wash cycles so that an adequate concentration is maintained. In a dump and fill machine, the wash solution is not reused between wash cycles. New detergent solution is added before the next wash cycle. Some non-limiting examples of door machines include the Ecolab Omega HT, the Hobart AM-14, the Ecolab ES-2000, the Hobart LT-1, the CMA EVA-200, American Dish Service L-3DW and HT-25, the Autochlor A5, the Champion D-HB, and the Jackson Tempstar.

In addition, the methods of use of the detergent compositions are also suitable for CIP and/or COP processes to replace the use of bulk detergents leaving hard water residues on treated surfaces. The methods of use may be desirable in additional applications where industrial standards are focused on the quality of the treated surface, such that the prevention of hard water scale accumulation provided by the detergent compositions of the invention are desirable. Such applications may include, but are not limited to, vehicle care, industrial, hospital and textile care.

Additional examples of applications of use for the detergent compositions include, for example, alkaline detergents effective as grill and oven cleaners, ware wash detergents, laundry detergents, laundry presoaks, drain cleaners, hard surface cleaners, surgical instrument cleaners, transportation vehicle cleaning, vehicle cleaners, dish wash presoaks, dish wash detergents, beverage machine cleaners, concrete cleaners, building exterior cleaners, metal cleaners, floor finish strippers, degreasers and burned-on soil removers. In a variety of these applications, cleaning compositions having a very high alkalinity are most desirable and efficacious, however the damage caused by corrosion of metal is undesirable.

The various methods of use according to the invention employ the use of the detergent composition, which may be formed prior to or at the point of use by combining the alkalinity source, amino carboxylate and other desired components (e.g. optional polymers and/or surfactants) in the weight percentages disclosed herein.

In certain embodiments, the detergent composition may be mixed with a water source prior to or at the point of use. In other embodiments, the detergent compositions do not require the formation of a use solution and/or further dilution and may be used without further dilution.

In aspects of the invention employing solid detergent compositions, a water source contacts the detergent composition to convert solid detergent compositions, particularly powders, into use solutions. Additional dispensing systems may also be utilized which are more suited for converting alternative solid detergents compositions into use solutions. The methods of the present invention include use of a variety of solid detergent compositions, including, for example, extruded blocks or "capsule" types of package.

In an aspect, a dispenser may be employed to spray water (e.g. in a spray pattern from a nozzle) to form a detergent use solution. For example, water may be sprayed toward an apparatus or other holding reservoir with the detergent composition, wherein the water reacts with the solid detergent composition to form the use solution. In certain embodiments of the methods of the invention, a use solution may be configured to drip downwardly due to gravity until the dissolved solution of the detergent composition is dispensed for use according to the invention. In an aspect, the use solution may be dispensed into a wash solution of a ware wash machine.

Use Compositions

The compositions of the present invention include concentrate compositions and use compositions. For example, a concentrate composition can be diluted, for example with water, to form a use composition. In an embodiment, a concentrate composition can be diluted to a use solution before to application to an object. For reasons of economics, the concentrate can be marketed and an end user can dilute the concentrate with water or an aqueous diluent to a use solution.

The level of active components in the concentrate composition is dependent on the intended dilution factor and the desired activity of the composition. Generally, a dilution of about 1 fluid ounce to about 10 gallons of water to about 10 fluid ounces to about 1 gallon of water is used for aqueous compositions of the present invention. In some embodiments, higher use dilutions can be employed if elevated use temperature (greater than 25° C.) or extended exposure time (greater than 30 seconds) can be employed. In the typical use locus, the concentrate is diluted with a major proportion of water using commonly available tap or service water mixing the materials at a dilution ratio of about 3 to about 40 ounces of concentrate per 100 gallons of water.

In other embodiments, a use composition can include about 0.01 to about 10 wt-% of a concentrate composition and about 90 to about 99.99 wt-% diluent; or about 0.1 to about 1 wt-% of a concentrate composition and about 99 to about 99.9 wt-% diluent.

Amounts of an ingredient in a use composition can be calculated from the amounts listed above for concentrate compositions and these dilution factors. It is to be understood that all values and ranges between these values and ranges are encompassed by the present invention.

Sample Formulas of the Invention

All are in percent by weight of the composition. Additional components as described herein can amount to as much as 0.001 to about 15 wt. % of the composition.

| Component | Formula 1 | Formula 2 | Formula 3 |
|---|---|---|---|
| Alkalinity | 0.05-99 | 0.1-95 | 0.5-90 |
| Quaternary cationic Surfactant | 0.01-10 | 0.05-7 | 0.1-5 |
| defoaming nonionic surfactant (and/or additional nonionic surfactant) | 0.01-15 | 0.1-12 | 0.5-10 |
| metal protector and/or water conditioning agent | 0.05-15 | 0.5-10 | 1-7.5 |
| chelant | 0.1-50 | 0.5-40 | 1-35 |
| enzyme | 0.1-20 | 0.5-10 | 1-5 |
| additional components | 0-15 | 0-12 | 0-10 |

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Applicants performed screening tests with various combinations of anionic, cationic, and/or nonionic surfactants. Of these, combinations containing anionic surfactants such as LAS, SLES, or other sulfonates were found unsatisfactory as generating too much foam even when combined with defoaming nonionic surfactants. Several surfactant blends containing defoaming nonionic surfactants in combination with either high cloud point nonionic, polycarboxylated anionic, amine oxide, or quaternary amine surfactants showed acceptable foam profiles and were then evaluated by warewash tests looking at the effect of these surfactant blends on oily soil removal. Here, the blends containing high cloud point nonionic, polycarboxylated anionic, and amine oxide surfactants showed insufficient oily soil removal at the levels needed to maintain low foam levels, and thus were found unsatisfactory. However, the applicants observed significant oil removal performance with a combination of a cationic/nonionic blended quaternary amine alcohol ethoxylate surfactant and a defoaming alcohol alkoxylate surfactant.

Figure 1B:
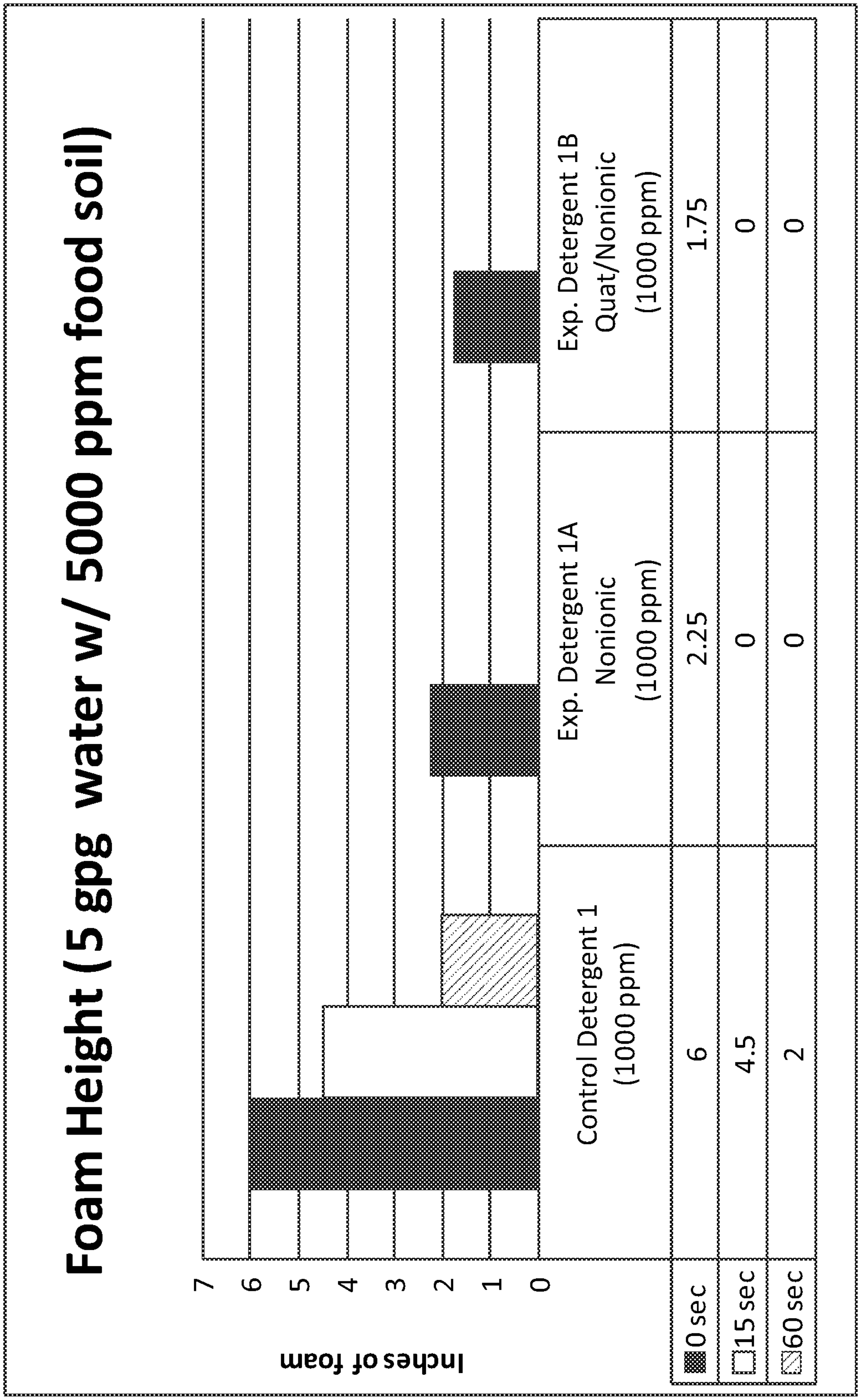

FIG. 1. Initial screening tests looking at different blends of surfactants and the impact they have on foam. We can see that the described quat/nonionic surfactant combination showed very little foam consistent with our current ash-based chemistries that have desirable foaming properties (Experimental Detergent 1). We have also included a negative control chemistry (Control Detergent 1) which is considered to produce an unacceptable level of foam.

We have performed 1 cycle evaluations on a number of formulations looking at the removal of a chili oil soil baked onto ceramic tiles. Below are several graphs showing the soil removal results for our prototype chemistries in comparison with several benchmark chemistries.

Glewwe Defoam Evaluation for Detergents

Test Protocol: The purpose of this test is to evaluate the foaming tendency of warewashing detergents and determine whether or not a defoamer is present in a product at an appropriate level. A Glewwe Foam apparatus with Spraying Systems VEE JET nozzle is used to test a use dilution of detergent in the presence of a powdered milk soil. 20 grams powered milk, 1000 ppm detergent and 55 ppm surfactant blend is used for each test. The detergent or surfactant is added to 160° F., soft water in a running Glewwe and the height of the foam is measured after one minute of agitation. The powered milks is then added to the Glewwe and agitated. After four minutes the agitation is stopped and foam height is measured at 0 s, 15 s, and 60 s. Foam that breaks rapidly (less than 30 seconds) is unstable. Foam that break slowly (within a minute) is partially stable. Foam that remains for several minutes is stable. Detergent formulations having foam heights below 3" while glewwe machine is running with unstable foam that breaks to nothing within 30 seconds are preferred. The test can be run over a range of temperatures (i.e. 100, 120, 140, and 160° F.) to check the detergents foam profile.

Chili Oil Removal Test for Warewash Detergent Evaluation

Test Protocol: A test method is provided for evaluating chili oil soil cleaning performance of detergent and/or surfactant formulations in a standard dish machine. The test is run using ceramic testing tiles in an institutional style dish machine. The tiles are first cleaned and dried so that they are free of any soil or debris on the surface of the tile and that there is no water on the tiles to interfere with soiling. Two drops of chili oil is then applied to a room temperature tile and spread on the surface of the tile to evenly coat the surface. The coated tiles are then baked in an over for 1 hour at 155° C. After baking, the tile are loaded into a peg rack and placed in the dish machine. The wash tank is charged with the detergent and/or surfactant composition and then run for one for cycle. The tiles are then stained with Sudan red dye to evaluate the cleaning performance of the detergent and/or surfactant composition. The stained tiles are imaged and evaluated with image analysis software (Fiji image J) to determine the percent soil removal from each tile. Results are compared within a set of tiles that were soiled at the same time.

The inventions being thus described, it will be obvious that the same may be varied in many ways. Such variations

| Raw Material | Experimental Detergent 1A | Experimental Detergent 1B | Experimental Detergent 1C | Experimental Detergent 1D | Ash Benchmark | Experimental Detergent 2A | Experimental Detergent 2B | Experimental Detergent 2C |
|---|---|---|---|---|---|---|---|---|
| Ash | 80.5 | 80.5 | 78.5 | 76.51 | 52.08 | 71 | 72 | 70 |
| Phosphate | | | | | 13.59 | | | |
| Chelant | 8 | 8 | 8 | 8 | 31 | 24 | 23 | 23 |
| Pluronic Surfactant | 4 | | | | 2 | 4 | | |
| Quat/nonionic blended surfactant | | 3 | 4.5 | 6 | | | 3 | 4.5 |
| Alcohol alkoxylate surfactant | | 1 | 1.5 | 2 | | | 1 | 1.5 |
| acrylic/maleic polymer | 5.56 | 5.56 | 5.56 | 5.56 | | | | |
| Na-aluminate(45%) | | | | | 0.33 | | | |
| Phosphonate | 0.93 | 0.93 | 0.93 | 0.93 | 1 | | | |
| Protease Enzyme | 1 | 1 | 1 | 1 | | 1 | 1 | 1 |
| % | 100 | 100 | 100 | 100 | 100 | 100 | 100 | 100 |

Figure 2:
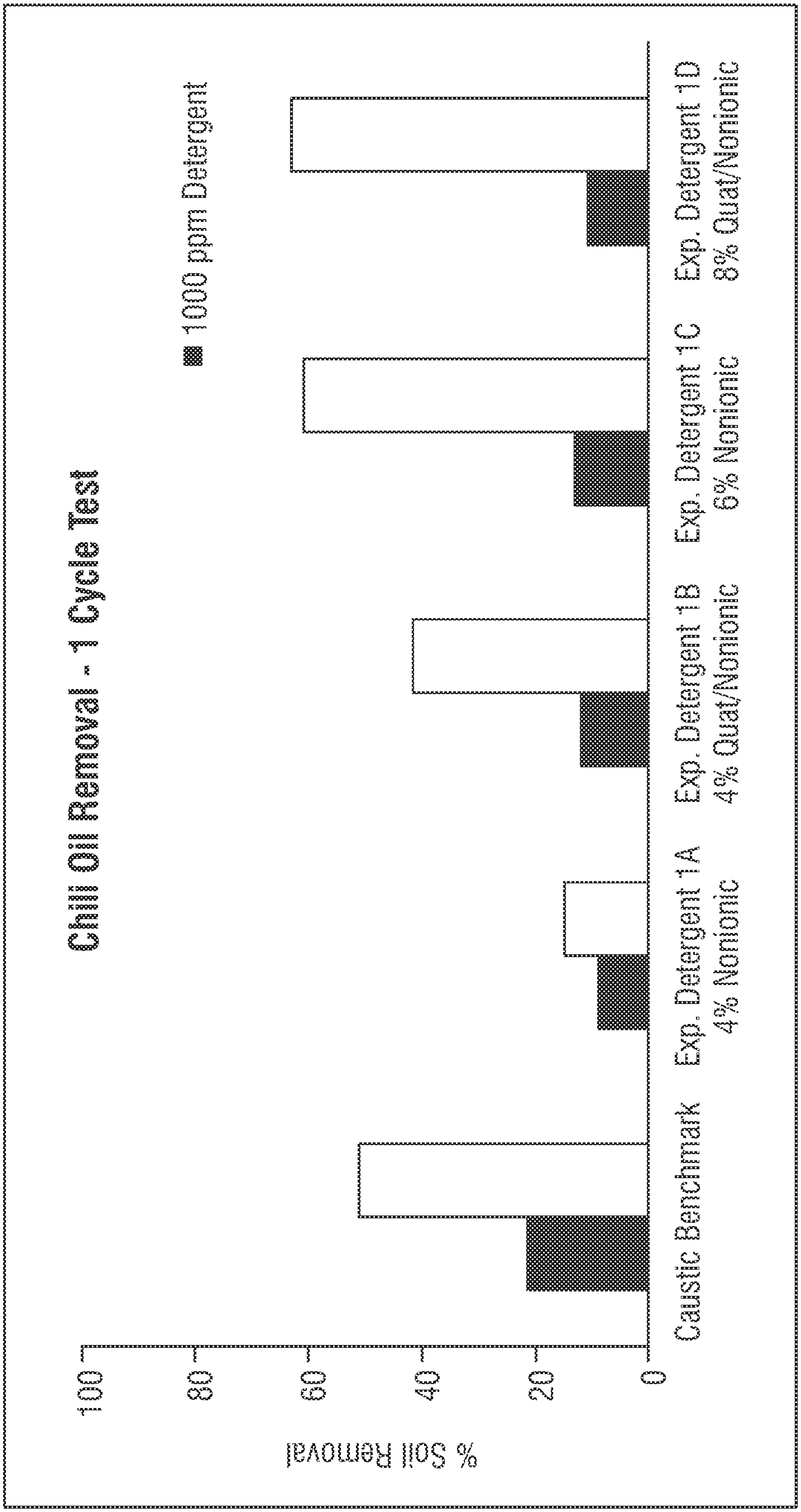
FIG. 2. Chili oil removal test results looking at the impact of blended cationic quaternary ammonium surfactant/nonionic surfactant/nonionic defoaming alcohol alkoxylate surfactant combination on oily soil removal for the Experimental Detergent 1 prototype formulation. We can see that swapping the traditional nonionic EO-PO surfactant with the new surfactant package leads to a significant boost in performance and in some cases exceeds the performance of the benchmark caustic formula.

FIG. 2. Chili oil removal test results looking at the impact of the quat/nonionic surfactant combination on oily soil removal for the Experimental Detergent 1 prototype formulation. We can see that swapping the traditional nonionic surfactant with the new surfactant package leads to a significant boost in performance and in some cases exceeds the performance of the benchmark caustic formula.

Figure 3:
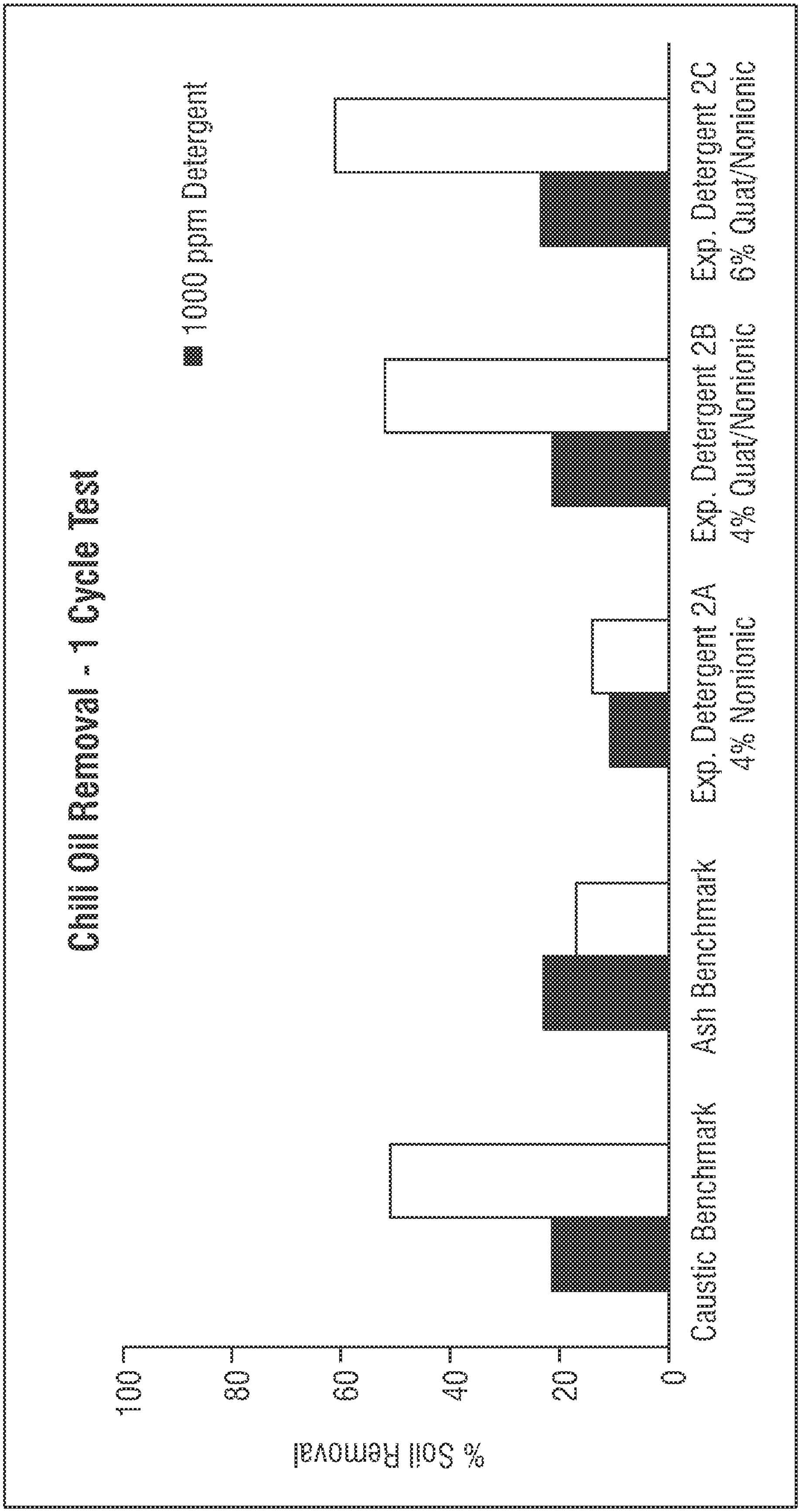
FIG. 3. Chili oil removal test results looking at the impact of Blended cationic quaternary ammonium surfactant/nonionic surfactant/nonionic defoaming alcohol alkoxylate surfactant combination on oily soil removal for Experimental Detergent 2 prototype formulation. We can see that swapping the traditional nonionic EO-PO surfactant with the new surfactant package leads to a significant boost in performance and in some cases exceeds the performance of the benchmark caustic formula.

FIG. 3. Chili oil removal test results looking at the impact of the quat/nonionic surfactant combination on oily soil removal for the Experimental Detergent 2 prototype formulation. We can see that swapping the traditional nonionic surfactant with the new surfactant package leads to a significant boost in performance and in some cases exceeds the performance of the benchmark caustic formula.

are not to be regarded as a departure from the spirit and scope of the inventions and all such modifications are intended to be included within the scope of the following claims.

What is claimed is:

1. A warewash alkaline detergent composition comprising:

from about 40 wt. % to about 90 wt. % of an alkalinity source;

from about 1 wt. % to about 20 wt. % of a surfactant component comprising a nonionic low foaming surfactant represented by the formula: $RO—(PO)_x(EO)_y(PO)_xH$, wherein R is C8-18 alkyl, PO is propylene oxide; EO is ethylene oxide; x is 1-8 and y is 1-20, and a cationic quaternary surfactant represented by the formula:

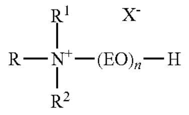

wherein R represents a C8-C18 alkyl or alkenyl; R1 and R2 are C1-C4 alkyl groups; n is 10-25; and x is an anion selected from a halide or methyl sulfate, said surfactants in a ratio of greater than 1:1;

from about 0.1 wt. % to about 10 wt. % of a defoaming nonionic surfactant; and one or more of a metal protector, water conditioning agent or polymer, an enzyme, a chelant, a bleaching agent, a solidification aid, and/or a carrier.

2. The composition of claim 1, wherein said alkalinity includes an alkali metal carbonate.

3. The composition of claim 1, wherein said metal protector is a polyacrylic or polymaleic acid polymer or an alkali metal silicate, wherein said water conditioning agent or polymer is a phosphonate, polycarboxylate or combinations thereof, and/or wherein said chelant is one or more of MGDA, GLDA, or EDTA.

4. The corn position of claim 1, wherein said cationic quaternary surfactant is a quaternary coco alkyl amine ethoxylate.

5. The composition of claim 1, wherein said quaternary cationic surfactant is present in an amount of from about 0.1 wt. % to about 5 wt. % and wherein said low foaming surfactant is present from about 0.5 wt. % to about 10 wt. %.

6. The composition of claim 1, wherein said defoaming surfactant is an alcohol alkoxylate and is present from about 0.1 wt. % to about 5 wt. %.

7. The composition of claim 1, wherein said ratio of said low foaming surfactant to quaternary amine alkoxylate surfactant is less than 10:1.

8. The composition of claim 1, wherein said composition is a solid.

9. A method of cleaning oily and fatty soils from ware comprising:

applying the detergent composition of claim 1 to ware surface in a dish machine; and thereafter rinsing said ware, wherein said detergent provides improved oily soil removal and acceptable foaming for dish machine performance.

10. The method of claim 9, wherein said detergent is diluted to form a use solution having a pH of at least about 9.

11. The method of claim 9, wherein said nonionic low foaming surfactant and said quaternary amine cationic surfactant are present in a ratio of greater than 1:1 and less than 5:1 by weight.

12. The method of claim 9, wherein said defoaming nonionic surfactant is an alcohol alkoxylate.

13. The method of claim 9, wherein the detergent is a solid and is diluted to form a use solution.

14. The method of claim 9, wherein said dish machine is an institutional dish machine or a clean in place machine.

15. The method of claim 9, wherein the detergent is a pressed, extruded or cast solid.

16. The method of claim 13, wherein the use solution is generated within a ware washing machine.

17. The method of claim 9, further comprising the step of generating a use solution of the detergent composition, wherein the detergent use solution has a pH between about 9 and 12.5.

18. The composition of claim 1, wherein said ratio of said low foaming surfactant to quaternary amine ethoxylate surfactant is from about 3:1 to about 5:1.

* * * * *